2,769,814
PROCESS FOR MAKING DIALKYL (3-INDOLYL-METHYL) MALONATES

Ethan C. Galloway, Midland, Mich., assignor to The Dow Chemical Company, Midland, Mich., a corporation of Delaware No Drawing. Application March 1, 1956,
Serial No. 568,713

8 Claims. (Cl. 260—319)

This invention concerns a process for making dialkyl-(3-indolylmethyl) malonates. It relates more particularly to a novel process for reacting 3-dialkylaminomethylindoles with certain derivatives of malonic esters to form the corresponding indole derivatives, e. g. diethyl-(3-indolylmethyl) malonate.

H. R. Snyder et al., in J. Amer. Chem. Soc., vol. 66, pp. 200–204, 1944, describe a method of making diethyl-(3-indolylmethyl) malonate by reacting the sodium derivative of ethyl malonate and methiodide of 2-dimethyl-aminomethylindole in the presence of butyl ether as a reaction medium. The prior method leaves much to be desired. One disadvantage is the difficulty of preparing and handling the sodium malonic ester starting material. Other drawbacks of the prior method include initial non-homogeneous reaction mixtures, steps requiring long reaction times and low yields of the desired product.

It is an object of the invention to provide an improved process for making dialkyl-(3-indolylmethyl) malonates. Another object is to provide a process for making dialkyl-(3-indolylmethyl) malonates from 3-dialkylaminomethylindoles and dialkyl-(alkoxymagnesium)malonates. A specific object is to provide a novel process for making diethyl-(3-indolylmethyl) malonate. Other and related objects may appear from the following description of the invention.

According to the invention the new process comprises reacting, under substantially anhydrous conditions, a 3-dialkylaminomethylindole having the general formula:

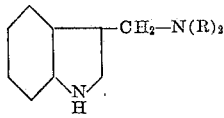

wherein R represents a lower alkyl radical containing from 1 to 3 carbon atoms, with a dialkyl-(alkoxymagnesium) malonate of the general formula:

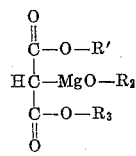

wherein $R_1$, $R_2$ and $R_3$ each represents a lower alkyl radical containing from 1 to 3 carbon atoms.

The 3-dialkylaminomethylindole and the dialkyl-(alkoxymagnesium) malonate are employed in amounts corresponding to at least 1, preferably from 1.2 to 2, gram molecular proportion of the dialkyl-(alkoxymagnesium) malonate per gram molecular equivalent proportion of the 3-dialkylaminomethylindole used. Employment of the reactants in amounts less than stoichiometric quantities or an amount of the dialkyl-(alkoxymagnesium) malonate less than the chemically equivalent to react with the 3-dialkylaminomethylindole starting material results in the formation of low yields of the desired product or a gummy material from which the product cannot readily be recovered.

The reaction can be carried out at temperatures between 110° and 225° C., preferably from 110° to 180° C., and at atmospheric pressure or thereabout, while having the reactants dissolved or substantially dissolved in an inert liquid organic compound such as toluene, xylene, ethylbenzene, ethyltoluene, isopropylbenzene, chlorobenzene, dichlorobenzene, ar-chlorotoluene, ar-chloroethylbenzene, trichlorobenzene, or 1,1,2,2,tetra-chloroethane.

The reaction is usually carried out at the refluxing temperature of the mixture, and preferably while bubbling an inert gas such as nitrogen, helium or methane through the mixture, to distill by-product dialkylamine from the reaction as it is formed.

The reaction medium is used in an amount sufficient to dissolve the dialkyl-(alkoxymagnesium) malonate, suitably in amounts of from 2 to 4 times the weight of the dialkyl-(alkoxymagnesium) malonate and form a reaction mixture with the 3-dialkylaminomethylindole starting material, a solution or slurry which can conveniently be agitated or stirred.

A suitable procedure for making the dialkyl-(alkoxymagnesium) malonate starting material is to dissolve the malonic ester in one or more of the aforementioned organic compounds, together with methyl alcohol, ethyl alcohol or propyl alcohol, and magnesium metal such as turnings, wire or powdered metallic magnesium, under anhydrous or substantially anhydrous conditions. The mixture is heated at temperatures between about 60° and 85° C. to initiate the reaction, or the reaction is initiated by the addition of a small amount of iodine or a halogen compound such as ethylbromide or carbon tetrachloride, and is continued at such temperatures until complete. The dialkyl-(alkoxymagnesium) malonate is obtained as a solution of the same in the solvent reaction medium, e. g. chlorobenzene together with ethyl alcohol. The solution is separated from the unconsumed magnesium in usual ways, e. g. by decanting, and, if desired, may be freed or substantially freed from the alcohol by heating the solution under reduced pressure to distill the alcohol therefrom. The dialkyl-(alkoxymagnesium) malonate is usually employed as a solution of the same in the solvent in which it is prepared, and may contain a minor amount, e. g. 25 percent or less, preferably not more than 10 percent, by weight of the alcohol.

In practice, a solution of the dialkyl-(alkoxy-magnesium) malonate is mixed with the 3-dialkylamino-methylindole in the desired proportions. The mixture is stirred and heated to temperatures between 110° and 225° C., usually at the refluxing temperature of the mixture, and preferably in an atmosphere of an inert gas, e. g. nitrogen, while distilling by-product dialkylamine from the reaction as it is formed, until the reaction is complete or substantially complete.

The mixture is cooled and the product is recovered in usual ways. The product can be recovered by washing the reaction mixture with an acid such as sulfuric acid or hydrochloric acid, then with water or suitably an aqueous concentrated solution of sodium chloride, after which the organic layer is separated. The product is recovered from the organic layer by evaporating the solvent, e. g. by heating the organic layer in vacuum to distill the solvent and leave the product as residue. The product can be further purified by crystallization from a suitable solvent.

The following examples illustrate ways in which the principle of the invention has been applied, but are not to be construed as limiting its scope.

*Example 1.—Preparation of diethyl-(ethoxymagnesium) malonate*

A mixture of 20 grams of diethyl malonate, 300 cc. of chlorobenzene, 20 cc. of absolute ethyl alcohol and 21.4 grams of magnesium turnings are placed in a reaction vessel equipped with a reflux condenser and stirrer. The mixture is stirred and heated to temperatures between 60° and 65° C. while passing nitrogen gas over the mixture to exclude air. The stirring is stopped, and 1 cc. of carbon tetrachloride is added, allowing it to settle to the bottom of the flask in contact with the magnesium turnings, to initiate the reaction, which usually occurs in a few minutes. Thereafter, the mixture is stirred and maintained at temperatures between 60° and 70° C. When the reaction is progressing at a satisfactory rate, a mixture of 50 cc. of absolute ethyl alcohol and 120.8 grams of diethyl malonate is added over a period of from one to two hours while maintaining the temperature of the mixture between 60° and 70° C. An additional 30 cc. of ethyl alcohol is added and the temperature of the mixture maintained at from 75° to 80° C. for a period of one hour or until the reaction is complete. The mixture is then cooled, suitably to room temperature, and separated from the unconsumed magnesium. The diethyl-(ethoxymagnesium) malonate is obtained as a solution of the same in the chlorobenzene solvent, together with a small amount, e. g. 10 percent by weight or less, of ethyl alcohol. The alcohol can be separated from the solution in usual ways, e. g. by distillation.

*Example 2*

A charge of 60 grams of a solution of diethyl-(ethoxymagnesium) malonate containing 25.34 grams (0.111 mole) of said compound dissolved in a mixture of 90 percent by weight of chlorobenzene and 10 percent of absolute ethyl alcohol, prepared by procedure similar to that described in Example 1, was placed in a reaction vessel equipped with a reflux condenser and stirrer. The mixture was stirred and 16.4 grams (0.094 mole) of 3-dimethylaminomethylindole (gramine) was added. Thereafter, the mixture was stirred and heated at refluxing temperatures of about 130° to 135° C. while bubbling nitrogen gas through the mixture over a period of 4.5 hours. Gases vented from the reaction were washed with 1-normal aqueous hydrochloric acid solution. Dimethylamine in amount corresponding to 92 percent of that theoretically possible was vented from the reaction. Thereafter, the reaction mixture was cooled to about 0° C. and was extracted with 28 cc. of an aqueous 26 weight percent solution of hydrochloric acid, then was washed with 40 cc. of an aqueous 24 weight percent solution of sodium chloride. The organic layer was separated. The chlorobenzene was evaporated by heating the organic layer on a water bath at absolute pressures of from 10 to 25 millimeters. There was obtained 26.2 grams of crude diethyl-(3-indolylmethyl) malonate as yellow crystals melting at 51° to 57° C.

I claim:

1. A process for making a dialkyl-(3-indolylmethyl) malonate which comprises reacting a dialkyl-(alkoxymagnesium) malonate having the general formula:

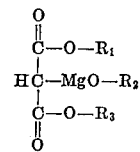

wherein $R_1$, $R_2$ and $R_3$ each represents an alkyl radical containing from 1 to 3 carbon atoms and a 3-dialkylaminomethylindole having the general formula:

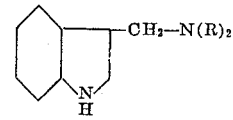

wherein R represents an alkyl radical containing from 1 to 3 carbon atoms, by heating a mixture of the reactants in proportions corresponding to from 1 to 2 gram molecular proportions of the dialkyl-(alkoxymagnesium) malonate per gram molecular proportion of the 3-dialkylaminomethylindole at temperatures between 110° and 225° C. in admixture with an inert liquid organic compound boiling at temperatures between 110° and 225° C. at 760 millimeters absolute pressure as a reaction medium and distilling by-product dialkylamine from the reaction at substantially the rate at which it is formed.

2. A process as claimed in claim 1, wherein the dialkyl-(alkoxymagnesium) malonate is diethyl-(ethoxymagnesium) malonate.

3. A process as claimed in claim 1, wherein the 3-dialkylaminomethylindole is 3-dimethylaminomethylindole.

4. A process as claimed in claim 1, wherein the liquid organic reaction medium comprises essentially chlorobenzene.

5. A process for making diethyl-(3-indolylmethyl) malonate which comprises reacting diethyl-(ethoxymagnesium) malonate and 3-dimethylaminomethylindole by heating a mixture of said reactants in proportions corresponding to from 1.2 to 2 gram molecular proportions of the diethyl-(ethoxymagnesium) malonate per gram molecular proportion of the 3-dimethylamino-methylindole at temperatures between 110° and 225° C. in admixing with an inert liquid organic compound boiling at temperatures between 110° and 225° C. at 760 millimeters absolute pressure as a reaction medium and distilling by-product dimethylamine from the reaction at substantially the rate at which it is formed.

6. A process as claimed in claim 5, wherein the liquid organic reaction medium comprises essentially chlorobenzene.

7. A process as claimed in claim 5, wherein the reaction is carried out at temperatures between 110° and 180° C.

8. A process as claimed in claim 6, wherein the reaction is carried out at the refluxing temperature of the chlorobenzene.

No references cited.